US006007952A

United States Patent [19]

[11] Patent Number: 6,007,952

[45] Date of Patent: Dec. 28, 1999

Ciampa et al.

[54] APPARATUS AND METHOD OF DEVELOPING A LATENT CHARGE IMAGE

[75] Inventors: David Paul Ciampa; Istvan Gorog, both of Lancaster; Peter Michael Ritt, East Petersburg; Owen Hugh Roberts, Jr., Landisville; Leonard Pratt Wilbur, Jr., Lancaster, all of Pa.

[73] Assignee: Thomson Consumer Electronics, Inc., Indianapolis, Ind.

[21] Appl. No.: 09/131,022

[22] Filed: Aug. 7, 1998

[51] Int. Cl.[6] .............................. G03B 41/00; G03C 5/00

[52] U.S. Cl. .............................................. 430/23; 396/546

[58] Field of Search ................................. 430/23, 25, 28; 396/546

[56] References Cited

U.S. PATENT DOCUMENTS

| | | | |
|---|---|---|---|
| 3,558,310 | 1/1971 | Mayaud | 96/36.1 |
| 4,921,767 | 5/1990 | Datta et al. | 430/23 |
| 5,093,217 | 3/1992 | Datta et al. | 430/28 |
| 5,370,952 | 12/1994 | Datta et al. | 430/28 |
| 5,477,285 | 12/1995 | Riddle et al. | 354/1 |
| 5,519,217 | 5/1996 | Wilbur et al. | 250/326 |
| 5,637,357 | 6/1997 | Stachelhaus et al. | 427/476 |
| 5,679,046 | 10/1997 | Kim et al. | 430/23 |
| 5,840,450 | 11/1998 | Cho | 430/23 |

*Primary Examiner*—John Goodrow
*Attorney, Agent, or Firm*—Joseph S. Tripoli; Dennis H. Irlbeck

[57] ABSTRACT

The invention includes an apparatus 40, 140 for developing a latent charge image formed on a photoreceptor 36 disposed on an interior surface of a faceplate panel 12. The apparatus 40, 140 comprises a developer tank 42 having a sidewall 44 closed at one end by a bottom portion 46 and at the other end by a panel support 48 having an opening 50 therethrough to provide access to the faceplate panel 12. The back electrode 52 has a potential applied thereto to establish an electrostatic drift field between the back electrode and the photoreceptor 36, which is grounded. Triboelectrically-charged, dry-powdered, light emitting phosphor material, having a charge of the same polarity as the potential applied to the back electrode 52, is injected into the developer tank 42, between the back electrode 52 and the faceplate panel 12. The triboelectrically-charged phosphor material is directed toward the photoreceptor 36 on the faceplate panel 12 by the applied electrostatic drift field. Panel skirt sidewall shields 66, 68 are disposed around a peripheral sidewall 18 of the faceplate panel 12 to repel the triboelectrically-charged phosphor material from the panel sidewall 18.

The method of developing the latent charge image formed on the photoreceptor 36 that is disposed on an interior surface of a faceplate panel 12 includes the steps of placing the faceplate panel 12 on the panel support 48 of the apparatus 40, 140 and positioning the panel skirt sidewall shield means 66, 68 in proximity to the sidewall 18 of the of the faceplate panel 12. The photoreceptor 36 is grounded and a potential is applied to the back electrode 52. Triboelectrically-charged phosphor materials, having a charge of the same polarity as the potential applied to the back electrode 52 are introduced into the developer tank 42, between the back electrode 52 and the faceplate panel 12. The phosphor material is directed toward the photoreceptor 36 on the faceplate panel 12 by the applied electrostatic drift field and repelled from the sidewall 18 of the faceplate panel by the panel skirt sidewall shields 66, 68.

5 Claims, 3 Drawing Sheets

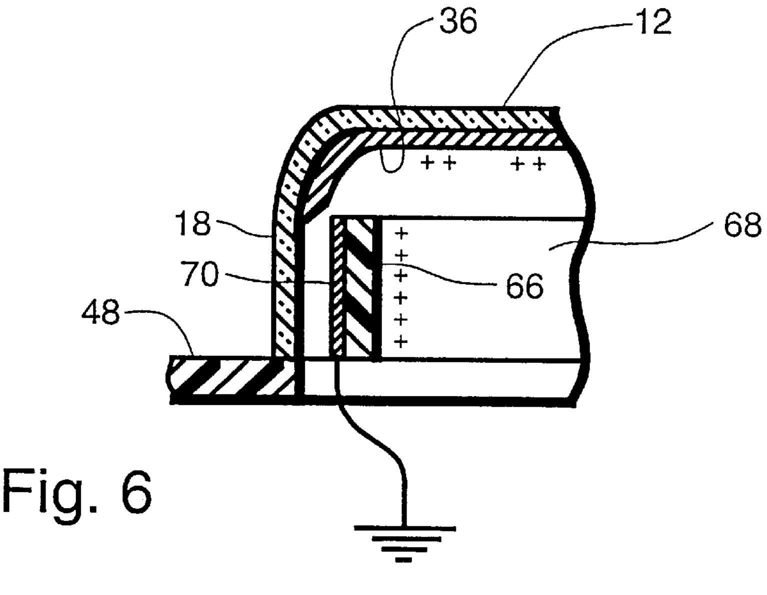
Fig. 6
Fig. 7
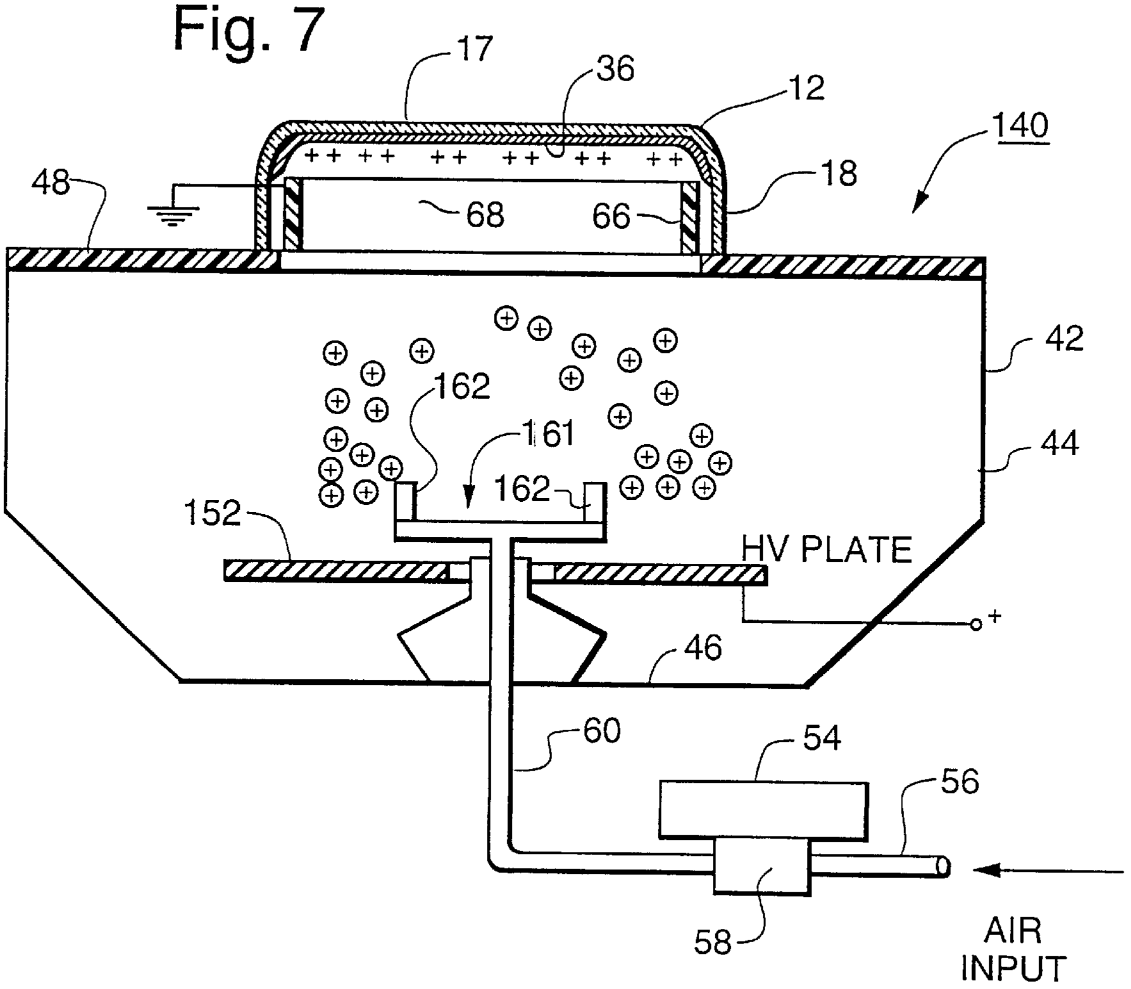

APPARATUS AND METHOD OF DEVELOPING A LATENT CHARGE IMAGE

The invention relates to an apparatus and method of developing a latent charge image on a photoreceptor which is disposed on an interior surface of a faceplate of a cathode-ray tube (CRT), and, more particularly, to an apparatus having a bottom electrode and a sidewall shield, and a method of operating a developing apparatus with the bottom electrode and shield.

BACKGROUND OF THE INVENTION

An apparatus for developing a latent charge image on a photoreceptor that is disposed on an interior surface of a viewing faceplate of a display device, such as a cathode-ray tube (CRT), using triboelectrically charged particles, is described in U.S. Pat. No. 5,477,285, issued on Dec. 19, 1995, to G. H. N. Riddle et al. In one embodiment of the developing apparatus, a developing chamber having insulating sidewalls and an insulative panel support is described. A triboelectric gun having a rotating nozzle system directs a mixture of air and dry, charged phosphor particles into the developing chamber where the phosphor collides with the walls of the surrounding chamber. The charged phosphor particles create a charge buildup on the insulating sidewalls of the developer and on the insulating shield that prevents phosphor deposition onto the skirt of the faceplate panel, and on a developer grid, more fully described in U.S. Pat. No. 5,093,217, issued to Datta et al. on Mar. 3, 1992. It is necessary to frequently clean the internal components of the developer to eliminate the phosphor buildup before it becomes loose and is deposited onto the photoreceptor in an uncontrolled manner. Additionally, after impact with the internal surfaces of the developer, the drifting phosphor particles approach the photoreceptor by virtue of uncontrolled space-charge repulsion. The impact produces agglomerates having an ill-defined charge and mass which could cause the phosphor particles to land in unwanted places on the photoreceptor provided on the interior surface of the CRT faceplate panel. This results in contamination of the different color phosphor lines formed on the photoreceptor. A need exists for a developer that significantly reduces phosphor buildup on its interior elements to reduce the frequency of cleaning, minimize the above-described drawback, and provide a more uniform phosphor deposition on the photoreceptor, with greater control over the deposition process.

SUMMARY OF THE INVENTION

In accordance with the present invention, an apparatus and method are disclosed for developing an electrostatic latent charge image which is formed on a photoreceptor that is disposed on an interior surface of a faceplate panel of a CRT. The apparatus comprises a developer tank having a sidewall closed at one end by a bottom portion and at the other end by a panel support having an opening therethrough to provide access to the panel. A back electrode is disposed within the developer tank and spaced from, but parallel to, the interior surface of the faceplate panel. The back electrode has a first potential applied thereto to establish an electrostatic drift field between the back electrode and the photoreceptor which is grounded. Triboelectrically-charged, dry-powdered, light emitting phosphor materials, having a charge of the same polarity as the first potential applied to the back electrode, are introduced into the developer tank, between the back electrode and the faceplate panel. The triboelectrically-charged phosphor materials, are directed toward said photoreceptor on the faceplate panel by the applied electrostatic drift field. A panel skirt sidewall shield is disposed around a peripheral sidewall of the faceplate panel to repel the triboelectrically-charged phosphor materials from the panel sidewall.

The method of developing the latent charge image formed on a photoreceptor that is disposed on an interior surface of a faceplate panel of a CRT includes the steps of placing the faceplate panel on the apparatus; positioning the panel skirt sidewall shield in proximity to the sidewall of the panel; grounding the photoreceptor; applying a first potential to the back electrode and introducing into the developer tank, between the back electrode and the faceplate panel, triboelectrically-charged phosphor materials, having a charge of the same polarity as the first potential applied to the back electrode whereby the phosphor materials are directed toward the photoreceptor on the faceplate panel by the applied electrostatic drift field.

BRIEF DESCRIPTION OF THE DRAWINGS

In the drawings:

FIG. 6 is an enlarged section of the CRT faceplate panel and shield shown within the circle 6 of FIG. 5; and FIG. 7 shows a second embodiment of the developing apparatus.

DETAILED DESCRIPTION OF THE PREFERRED EMBODIMENT

Figure 1:
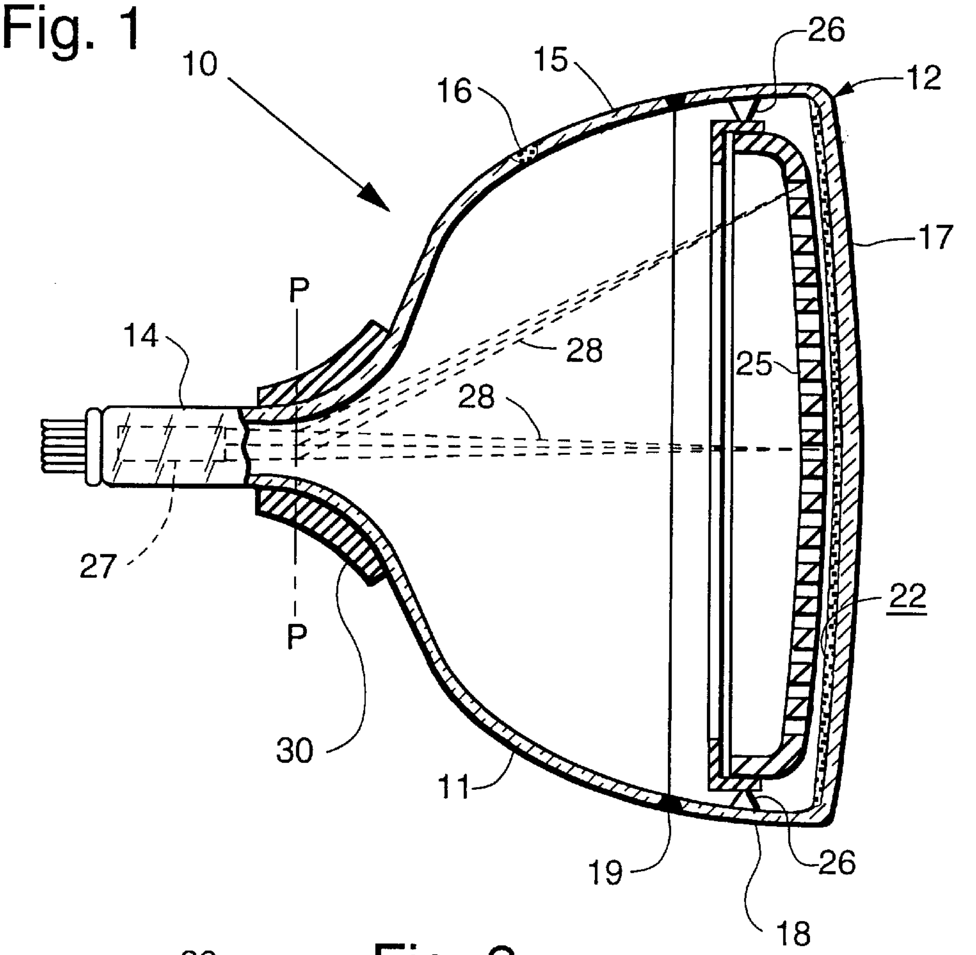
FIG. 1 is a plane view, partially in axial section, of a color CRT made according to the present method.
Figure 2:
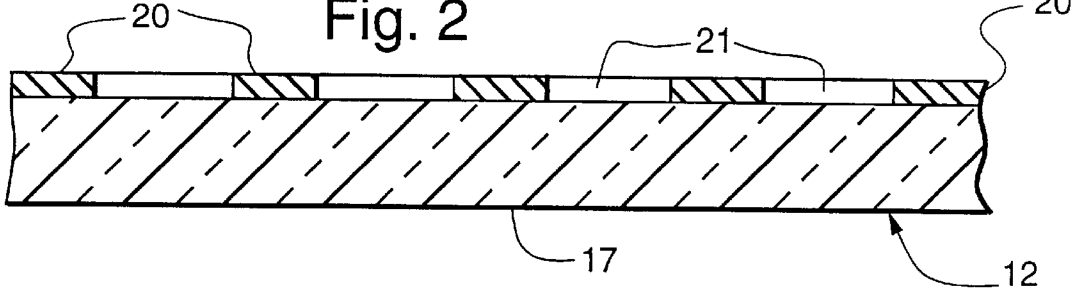
FIG. 2 is a section of a CRT faceplate panel with a matrix on an interior surface thereof during one step of the manufacturing process.
Figure 3:
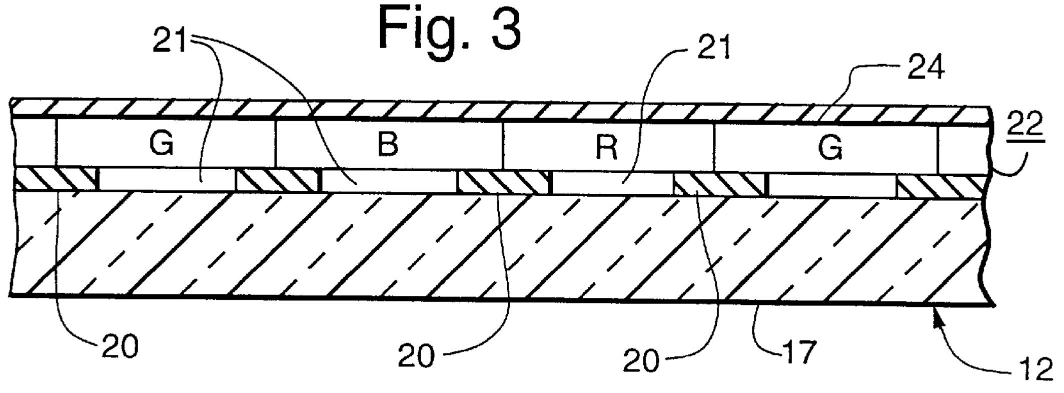
FIG. 3 is a section of a completed screen assembly of the tube shown in FIG. 1.

FIG. 1 shows a color CRT 10 having a glass envelope 11 comprising a rectangular faceplate panel 12 and a tubular neck 14 connected by a rectangular funnel 15. The funnel 15 has an internal conductive coating (not shown) that contacts an anode button 16 and extends into the neck 14. The panel 12 comprises a viewing faceplate 17 and a peripheral flange or sidewall 18, which is sealed to the funnel 15 by a glass frit 19. As shown in FIG. 2, a relatively thin, light absorbing matrix 20, having a plurality of openings 21, is provided on an interior surface of the viewing faceplate 17. A luminescent three color phosphor screen 22 is carried on the interior surface of the faceplate 17 and overlies the matrix 20. The screen 22, shown in FIG. 3, preferably, is a line screen which includes a multiplicity of screen elements comprised of red-, blue-, and green-emitting phosphor stripes, R, B, and G, centered in different ones of the matrix openings 21 and arranged in color groups or picture elements of three stripes or triads, in a cyclic order. The stripes extend in a direction which is generally normal to the plane in which the electron beams are generated. In the normal viewing position of the embodiment, the phosphor stripes extend in the vertical direction. Preferably, portions of the phosphor stripes overlap at least a portion of the light absorptive matrix 20 surrounding the openings 21. Alternatively, a dot screen also may be utilized. A thin conductive layer 24, preferably of aluminum, overlies the screen 22 and provides means for applying a uniform potential to the screen, as well as for reflecting light, emitted from the phosphor elements, through the faceplate 17. The screen 22 and the overlying aluminum layer 24 comprise a screen assembly. Again with reference to FIG. 1, a multi-apertured color selection electrode, such as a shadow mask, a tension mask or a focus mask, 25 is removably mounted, by conventional means, in predetermined spaced relation to the screen assembly. The color selection electrode 25 is detachably attached to a plurality of studs 26 embedded in the sidewall 18 of the panel 12, in a manner known in the art.

An electron gun 27, shown schematically by the dashed lines, is centrally mounted within the neck 14, to generate and direct three electron beams 28 along convergent paths, through the apertures in the color selection electrode 25, to the screen 22. The electron gun is conventional and may be any suitable gun known in the art.

The tube 10 is designed to be used with an external magnetic deflection yoke, such as yoke 30, located in the region of the funnel-to-neck junction. When activated, the yoke 30 subjects the three beams 28 to magnetic fields which cause the beams to scan horizontally and vertically, in a rectangular raster, over the screen 22. The initial plane of deflection (at zero deflection) is shown by the line P—P in FIG. 1, at about the middle of the yoke 30. For simplicity, the actual curvatures of the deflection beam paths, in the deflection zone, are not shown.

Figure 4:
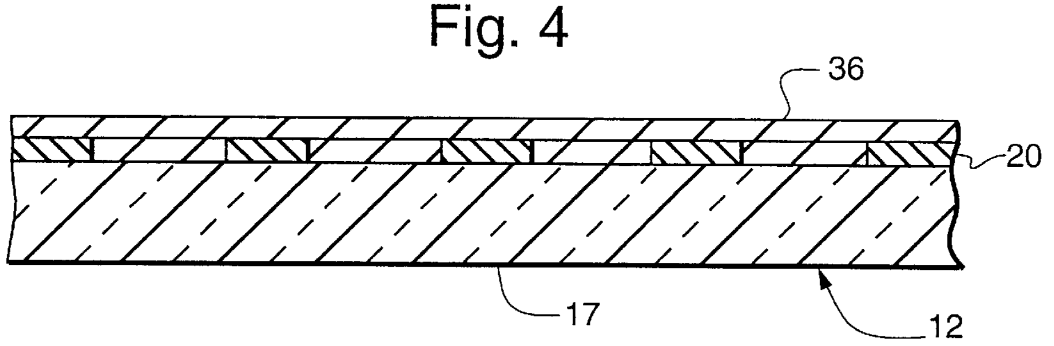
FIG. 4 is a section of the CRT faceplate panel showing a photoreceptor overlying the matrix during another step of the manufacturing process.

The screen 22 is manufactured by an electrophotographic screening (EPS) process that is described in U.S. Pat. No. 4,921,767, issued to Datta et al. on May 1, 1990. Initially, the panel 12 is cleaned by washing it with a caustic solution, rinsing it in water, etching it with buffered hydrofluoric acid and rinsing it again with water, as is known in the art. The interior surface of the viewing faceplate 17 is then provided with the light absorbing matrix 20, preferably, using the conventional wet matrix process described in U.S. Pat. No. 3,558,310, issued to Mayaud on Jan. 26, 1971. In the wet matrix process, a suitable photoresist solution is applied to the interior surface, e.g., by spin coating, and the solution is dried to form a photoresist layer. Then, the color selection electrode 25 is inserted into the panel 12 and the panel is placed onto a three-in-one lighthouse (not shown) which exposes the photoresist layer to actinic radiation from a light source which projects light through the openings in the color selection electrode. The exposure is repeated two more times with the light source located to simulate the paths of the electron beams from the three electron guns. The light selectively alters the solubility of the exposed areas of the photoresist layer. After the third exposure, the panel is removed from the lighthouse and the color selection electrode is removed from the panel. The photoresist layer is developed, using water, to remove the more soluble areas thereof, thereby exposing the underlying interior surface of the viewing faceplate, and leaving the less soluble, exposed areas of the photoresist layer intact. Then, a suitable solution of light-absorbing material is uniformly provided onto the interior surface of the faceplate panel to cover the exposed portion of the viewing faceplate and the retained, less soluble, areas of the photoresist layer. The layer of light-absorbing material is dried and developed using a suitable solution which will dissolve and remove the retained portion of the photoresist layer and the overlying light-absorbing material, forming openings 21 in the matrix 20 which is adhered to the interior surface of the viewing faceplate. For a panel 12 having a diagonal dimension of 51 cm (20 inches), the openings 21 formed in the matrix 20 have a width of about 0.13 to 0.18 mm, and the opaque matrix lines have a width of about 0.1 to 0.15 mm. The interior surface of the viewing faceplate 17, having the matrix 20 thereon, is then coated with a suitable layer of a volatilizable, organic conductive (OC) material, not shown, which provides an electrode for an overlying volatilizable, organic photoconductive (OPC) layer, also not shown. The OC layer and the OPC layer, in combination, comprise a photoreceptor 36, shown in FIG. 4.

Figure 5:
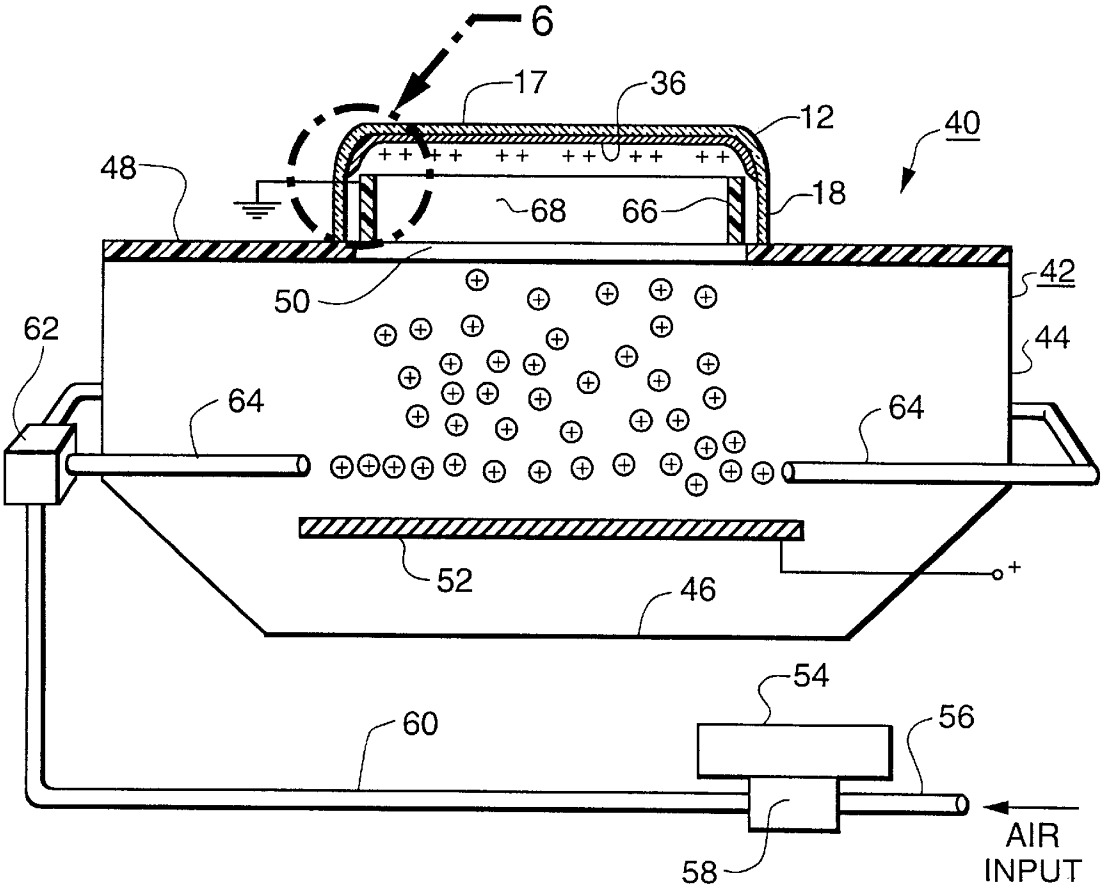
FIG. 5 shows a first embodiment of a developing apparatus utilized in the present invention.

Suitable materials for the OC layer include certain quaternary ammonium polyelectrolytes described in U.S. Pat. No. 5,370,952, issued to P. Datta et al. on Dec. 6, 1994. Preferably, the OPC layer is formed by coating the OC layer with a solution containing polystyrene; an electron donor material, such as 1,4-di(2,4-methyl phenyl)-1,4 diphenylbutatriene (2,4-DMPBT); electron acceptor materials, such as 2,4,7-trinitro-9-fluorenone (TNF) and 2-ethylanthroquinone (2-EAQ); and a suitable solvent, such as toluene, xylene, or a mixture of toluene and xylene. A surfactant, such as silicone U-7602 and a plasticizer, such as dioctyl phthalate (DOP), also may be added to the solution. The surfactant U-7602 is available from Union Carbide, Danbury, Conn. The photoreceptor 36 is uniformly electrostatically charged using a corona discharge device (not shown), but described in U.S. Pat. No. 5,519,217, issued on May 21, 1996, to Wilbur et al., which charges the photoreceptor 36 to a voltage within the range of approximately +200 to +700 volts. The color selection electrode 25 is then inserted into the panel 12, which is placed onto a lighthouse (also not shown) and the positively charged OPC layer of the photoreceptor 36 is exposed, through the color selection electrode 25, to light from a xenon flash lamp, or other light source of sufficient intensity, such as a mercury arc, disposed within the lighthouse. The light which passes through the apertures in the color selection electrode 25, at an angle identical to that of one of the electron beams from the electron gun of the tube, discharges the illuminated areas on the photoreceptor 36 and forms a latent charge image (not shown). The color selection electrode 25 is removed from the panel 12 and the panel is placed onto a first phosphor developer 40, such as that shown in FIG. 5.

In a first embodiment of the present invention, the phosphor developer 40 comprises a developer tank 42 having a sidewall 44 closed at one end by a bottom portion 46 and at the top end by a panel support 48, preferably made of PLEXIGLAS or another insulative material, having an opening 50 therethrough to provide access to the interior of the faceplate panel 12. The sidewall 44 and bottom portion 46 of the developer tank 42 are made of an insulator, such as PLEXIGLAS, externally surrounded by a ground shield made of metal. A back electrode 52 is disposed within the developer tank 42 and is spaced about 25 to 30 cm beneath the center of the interior surface of the faceplate panel 12. A positive potential of about 25 to 30 kV is applied to the back electrode 52 and the organic conductor of the photoreceptor 36 is grounded. With a spacing of 30 cm between the back electrode 52 and the faceplate panel 12, a drift field of 1 kV/cm or $10^5$ V/cm is established.

Phosphor material, in the form of a dry powder particles, of the desired light-emitting color is dispersed from a phosphor feeder 54, for example by means of an auger, not shown, into an air stream which passes through a tube 56 into a venturi 58 where it is mixed with the phosphor particles. The air-phosphor mixture is channeled into a tube 60 which imparts a triboelectric charge to the phosphor powder due to contact between the phosphor particles and the interior surface of the tube 60. For example, to positively charge the phosphor material a polyethylene tube is used. The phosphor-air mixture then passes through a three-way ball valve, 62, which directs the mixture to one of two equal lengths of polyethylene tubing 60. Each of the tubes 60 terminates in a manifold, not shown, having a series of flat profile outlet nozzles 64, only two of which are shown, that spray the phosphor-air mixture in a direction parallel to the back electrode 52. To achieve a uniform phosphor deposition on the charge image formed on the photoreceptor 36, phosphor particles are injected from the nozzle 64 of one manifold for about 30 seconds. Then, the ball valve 62 is turned, and the phosphor particles are injected from the nozzle 64 of the other manifold for the same time period. The phosphor particles of the injected phosphor material have a typical mobility, $\mu$, of about $3\times10^{-6}$ (m/s)/(V/m), and the characteristic drift velocity, v, of the phosphor particles in the drift field is about 0.3 m/sec. As the phosphor material is injected into the drift space in the vicinity of the back electrode 52, typically within about 10 cm from the back electrode, the phosphor particles drift toward the photoreceptor 36 on the panel 12 and arrive there in a fraction of a second. To prevent the deposition of phosphor material on the inner sidewall of the rectangular panel 12, two pairs of panel skirt sidewall shields 66 and 68 are utilized to form a rectangular shield array. The shields 66 are spaced from the short sides of the panel sidewall while the shields 68 are spaced from the long sides of the panel sidewall. The shields 66 and 68 are formed of an insulative material, such as nylon, and have a thickness of about 2.5 mm and a height of about 5 cm for a faceplate panel having a diagonal dimension of about 51 cm. The pairs of shields 66 and 68 have a dielectric constant that is three times that of vacuum.

When the injection of the triboelectrically charged phosphor particles is initiated, the pairs of shields 66 and 68, initially, will be impacted by some of the charged phosphor particles and will accumulate charge before this charge neutralizes the normal component of the electric field and further charged phosphor collection by the shields stop. The typical value for a 51 cm EPS panel deposit is ten microcoulombs, $\mu$C, of phosphor charge. The initial shield deposit of 2 $\mu$C is a significant fraction of the panel deposit. If the shields 66 and 68 are not cleaned between successive panel deposits, in normal dry air, the charge on the shields will be conserved for multiple phosphor deposits. However, the electrostatic conditions in the vicinity of the shields 66 and 68 are not constant. For example, when the deposition of phosphor particles on the latent charge image is completed, the panel 12 is unloaded from the apparatus 40. To aid panel loading and unloading, the shields are moved away from the panel interior sidewall, thereby changing the capacitance between the charged surface of the shields 66 and 68 and that of the grounded sidewall of the panel. Because the shields 66 and 68 have a constant charge and since V=Q/C, where V is the capacitor voltage, Q is the stored charge, and C is the capacitance of the shields, as the capacitance decreases, the local voltage on the shields increases and these voltage changes may cause lateral phosphor movement, or charge migration, on the shields. This could result in displacement or removal of the accumulated phosphor from the shields and the resultant deposition of unwanted phosphor onto the photoreceptor, leading to panel defects. To prevent the accumulation of phosphor particles on the shields 66 and 68, the shields are primed with positive ions prior to loading of a panel 12 on the developing apparatus 40. In order to prime the shields 66 and 68 a grounded plate or a panel coated only with an OC layer is placed onto the developer and positive ions are injected from the nozzles 64 into the drift space between the back electrode 52 and the panel 12. The positive ions will be deposited onto the shields 66 and 68 and will cancel the normal component of the electric field at the shield, so that in the subsequent phosphor deposition process, the shields will not attract and accumulate the positively charged phosphor particles.

An alternate approach to injecting positive ions into the drift space is to ionize the air in the drift space. This can be accomplished, for example by means of ionizing radiation. When the air in the drift space is ionized, preferably in the region close to the positive back electrode 52, the negative ions will be collected by the positively charged back electrode and the positive ions will drift towards a grounded faceplate panel. The positive ions also will be attracted to the grounded shields 66 and 68.

A method of significantly reducing changes in the capacitance of the shields 66 and 68, when the shields are moved away from the panel interior sidewall during the loading and unloading of the panel 12 from the developing apparatus 40, is to provide a ground plate 70, shown in FIG. 6, on the back or sidewall-facing surfaces of the shields 66 and 68. The capacitance of the system formed by ground plate 70 and the charged shields 66 and 68 does not change during shield movement and, therefore, the local voltage on the shields also does not change. Thus, lateral phosphor movement on the shields 66 and 68 is reduced, significantly.

FIG. 7 shows a second embodiment of a developer 140. In this embodiment, the same numbers are used to indicate elements that are identical to those of the first embodiment. The developer 140 comprises a developer tank 42 having a sidewall 44 closed at one end by a bottom portion 46 and at the top end by a panel support 48, preferably made of PLEXIGLAS or another insulative material, having an opening 50 therethrough to provide access to the interior of the faceplate panel 12. The sidewall 44 and bottom portion 46 of the developer tank 42 are made of an insulator, such as PLEXIGLAS, externally surrounded by a ground shield made of metal. A back electrode 152 is disposed within the developer tank 42 and is spaced about 36 cm beneath the center of the interior surface of the faceplate panel 12. A positive potential of about 35 kV is applied to the back electrode 152 and the organic conductor of the photoreceptor 36 is grounded. The back electrode 152 has a dimension of 51 cm by 41.3 cm and is situated about 36 cm below the center of the panel 12. The back electrode 152 is biased at a positive potential of 35 kV with respect to the OC layer of the photoreceptor 36. The back electrode 152 has on opening therein to accommodate the rotating nozzle assembly 161 having two nozzles 162, separated by a distance of about 17.8 cm. The deposition uniformity of the phosphor particles across the panel 12 is controlled by adjusting the angular orientation of the rotating nozzles, as described in U.S. Pat. No. 5,477,285, issued to Riddle et al. on Dec. 19, 1995.

As described above, phosphor material, in the form of a dry powder particles, of the desired light-emitting color is dispersed from the phosphor feeder 54, for example by means of an auger, not shown, into an air stream which passes through the tube 56 into the venturi 58 where it is mixed with the phosphor particles. The air-phosphor mixture is channeled into the tube 60 which imparts a triboelectric charge to the phosphor powder due to contact between the phosphor particles and the interior surface of the tube 60. For example, to positively charge the phosphor material a polyethylene tube is used. The air-phosphor mixture is directed into the rotating nozzle assembly 161 and out of the nozzles 162. To prevent the deposition of the phosphor material on the inner sidewall of the rectangular panel 12, two pairs of panel skirt sidewall shields 66 and 68 are utilized to form a rectangular shield array, as described above. The phosphor deposition time using these parameters is about 45 seconds.

A test was run using fifty development cycles on two faceplate panels 12. On one panel the shields 66 and 68 did not have a ground plate 70 disposed on the panel sidewall-facing surface of the shields. On the other panel, the shields 66 and 68 had a ground plate 70 thereon. The shields 66 and 68 in both test groups were adjustable rather than stationary. The effectiveness of the ground plate 70 was determined by defining two 80 mil×80 mil sample areas on each panel and measuring the number of large agglomerates of phosphor particles in one area, and in the other area measuring the amount of cross contamination. Cross contamination is defined as the number of phosphor particles on a given color which are deposited in the line position designated for a different color. The agglomerates sample area was located in the 8 o'clock diagonal corner of the panel and the cross contamination sample area was located at the 6 o'clock edge of the panel. The results of the test are summarized in the TABLE

TABLE

| Panel Number | Ground Plate | Number of Agglomerates | Number of Incidents of Cross Contamination |
|---|---|---|---|
| AF0019 | No | 350 | 599 |
| AM0047 | Yes | 6 | 150 |

It can be seen that the presence of the ground plate 70 on the shields 66 and 68 provides a substantial reduction in panel defects.

What is claimed is:

1. An apparatus for developing, with suitably triboelectrically-charged, dry-powdered, light-emitting phosphor materials, an electrostatic latent charge image formed on a photoreceptor which is disposed on an interior surface of a faceplate panel having a peripheral sidewall, said apparatus comprising a developer tank having a sidewall closed at one end by a bottom portion and at the other end by a panel support having an opening therethrough to provide access to the panel, a back electrode disposed within said developer tank and spaced from, but parallel to, the interior surface of the faceplate panel, said back electrode having a potential applied thereto to establish a drift field between said back electrode and said photoreceptor, at least one injector for injecting said triboelectrically-charged, dry-powdered, light emitting phosphor materials into said developer tank, between said back electrode and said faceplate panel, said triboelectrically-charged phosphor materials having a charge of the same polarity as the potential applied to said back electrode, whereby said phosphor materials are directed toward said photoreceptor on said faceplate panel, and a panel skirt sidewall shield array disposed around said peripheral sidewall of said faceplate panel to repel said triboelectrically-charged phosphor materials therefrom.

2. The apparatus as described in claim 1, wherein said panel skirt sidewall shield array comprises two pairs of insulative members.

3. The apparatus as described in claim 2, wherein said insulative members further include a ground plate on one surface of each of said insulative members.

4. The apparatus as described in claim 3, wherein said ground plate is disposed on the surface of said insulative members facing said peripheral sidewall of said faceplate panel.

5. A method for developing a latent charge image on a photoreceptor which is disposed on an interior surface of a faceplate panel of a cathode-ray tube (CRT) with suitably triboelectrically-charged, dry-powdered, light-emitting phosphor materials, said faceplate panel having a peripheral sidewall, said method comprising the steps of positioning said faceplate panel on a panel support of a developer, said developer including a panel skirt sidewall shield array disposed around said peripheral sidewall of said faceplate panel, a tank having a tank sidewall closed at one end by a bottom portion and at the other end by said panel support having an opening therethrough to provide access to said faceplate panel, a back electrode disposed within said developer tank and spaced from, but parallel to, said interior surface of the faceplate panel;

grounding said photoreceptor;

providing a charge on said panel skirt sidewall shield array to prevent said triboelectrically-charged phosphor materials from accumulating thereon;

providing a positive potential to said back electrode to establish a drift field between said back electrode and said photoreceptor; and injecting said triboelectrically-charged, dry-powdered, light emitting phosphor material into said developer tank, between said back electrode and said faceplate panel, said triboelectrically-charged phosphor materials having a charge of the same polarity as the potential applied to said back electrode, whereby said phosphor material is directed toward said photoreceptor on said faceplate panel.

* * * * *